United States Patent [19]
Kakita et al.

[11] Patent Number: 5,322,156
[45] Date of Patent: Jun. 21, 1994

[54] VEHICLE BODY CONVEYING APPARATUS

[75] Inventors: Takuya Kakita, Kurashiki; Noriyuki Inoue, Okayama; Shoichi Okada, Kurashiki; Yoshiki Nakamura, Kurashiki; Wakaharu Ikeda, Kurashiki; Akira Mikami, Kurashiki; Akiyoshi Kimura, Kurashiki; Masayuki Aihara, Kurashiki; Hisashi Fujiwara, Tamano; Yuji Watanabe, Okayama, all of Japan

[73] Assignee: Mitsubishi Jidosha Kogyo Kabushiki Kaisha, Tokyo, Japan

[21] Appl. No.: 39,427

[22] PCT Filed: Aug. 31, 1992

[86] PCT No.: PCT/JP90/01112
§ 371 Date: Apr. 29, 1993
§ 102(e) Date: Apr. 29, 1993

[87] PCT Pub. No.: WO93/04814
PCT Pub. Date: Mar. 18, 1993

[30] Foreign Application Priority Data

Aug. 30, 1991 [JP] Japan .................. 3-69609
Aug. 30, 1991 [JP] Japan .................. 3-69610

[51] Int. Cl.5 ............................................ B65G 15/10
[52] U.S. Cl. ................................. 198/463.3; 198/817
[58] Field of Search .............. 198/345.1, 345.3, 463.3, 198/606, 468.9, 817; 29/824

[56] References Cited

U.S. PATENT DOCUMENTS

| | | | |
|---|---|---|---|
| 3,737,021 | 6/1973 | Reth et al. | 198/463.3 X |
| 4,040,512 | 8/1977 | Ness | 198/463.3 |
| 4,336,438 | 6/1982 | Vehara et al. | 198/817 X |
| 4,722,355 | 2/1988 | Moe et al. | 198/817 X |
| 4,776,085 | 10/1988 | Shiiba | 29/824 |

FOREIGN PATENT DOCUMENTS

| | | |
|---|---|---|
| 3223357 | 12/1983 | Fed. Rep. of Germany ... 198/463.3 |
| 62-122873 | 6/1987 | Japan . |
| 62-205873 | 9/1987 | Japan . |
| 62-205999 | 9/1987 | Japan . |

*Primary Examiner*—James R. Bidwell

[57] ABSTRACT

The present invention is a vehicle body conveying apparatus in which a vehicle body (20) conveyed by a shuttle conveyor (32) is then conveyed in the order of an inclining belt conveyor (1) and a slat conveyor (21). A miniconveyor (26) is disposed between the inclining belt conveyor (1) and the slat conveyor (21) in such a relation that a rear end of the miniconveyor (26) overlaps a delivery side of the inclining belt conveyor (1), and the front end overlaps a receiving side of the slat conveyor (21) so as to ensure smooth transfer of the vehicle body (20) between them. Further, the inclining belt conveyor (1) is inclined by an elevating mechanism (8) to separate the vehicle body (20) from the shuttle conveyor (32).

8 Claims, 4 Drawing Sheets

VEHICLE BODY CONVEYING APPARATUS

TECHNICAL FIELD

This invention relates to an apparatus for conveying vehicle bodies through welding and assembling steps, painting steps, etc. on an automotive vehicle assembly line.

BACKGROUND OF THE INVENTION

When a vehicle body is conveyed through welding and assembling steps, etc. on an automotive vehicle assembly line, the conveying efficiency is rather lowered due to the differences in the details of work in the individual steps even when an attempt is made so as to maintain a constant vehicle conveying speed. That is, it is more efficient to convey the vehicle body at a low speed during each of the welding and assembling steps, and, after this welding and assembling step, to convey the vehicle body at a high speed between that step and the next welding and assembling step.

Therefore, in the finishing steps which are performed after the welding and assembling steps on the vehicle body are completed to a certain extent, and in which the operator makes necessary finishing including external appearance check, finish working, repair, etc., it is a common practice that the vehicle body having been subjected to a certain extent to the required welding and assembling is conveyed by a shuttle conveyor onto a roller conveyor, and the vehicle body is then conveyed by this roller conveyor onto a slat conveyor disposed at the finishing station to permit the required finishing by the operator.

In this case, the shuttle conveyor conveys the vehicle body onto the roller conveyor while supporting left and right side members fixed by welding to a floor panel of the vehicle body. Therefore, the roller conveyor conveys the vehicle body toward the slat conveyor while supporting left and right side sills of the vehicle body.

The roller conveyor is composed of many rollers of the shape of round bars having the same diameter and arranged in parallel to each other, and a force for rotating these rollers in one direction is imparted to the rollers so as to convey the vehicle body placed on the rollers. At the delivery end of this roller conveyor, its end roller is located in close proximity to the receiving end of the slat conveyor so that the vehicle body can be smoothly transferred from the roller conveyor to the slat conveyor.

However, when the vehicle body is conveyed onto the slat conveyor while being supported at the left and right side sills by the roller conveyor and these side sills ride over the individual rollers, such a problem may arise that the vehicle body cannot be smoothly conveyed due to engagement of the ends of the side sills with the rollers, and the side sills tend to be hurt by engagement with the rollers.

On the other hand, when a belt conveyor is used in lieu of the roller conveyor, such another problem may arise that a large gap is formed between the delivery end of the belt conveyor and the receiving end of the slat conveyor by the presence of a drive mechanism disposed between the delivery end of the belt conveyor and the receiving end of the slat conveyor, with the result that the vehicle body cannot be smoothly transferred.

Further, the shuttle conveyor has engaging pins engageable with engaging holes formed on the side members of the vehicle body, and, when the shuttle conveyor is advanced to receive the vehicle body on the belt conveyor until the vehicle body is completely transferred onto the belt conveyor. The shuttle conveyor is then retracted, so that one vehicle body after another can be successively placed on the belt conveyor.

However, because the shuttle conveyor supports the vehicle body by the engaging pins engaging the corresponding engaging holes formed on the side members of the vehicle body, the vehicle body cannot be disengaged from the shuttle conveyor, and the shuttle conveyor cannot be retracted, unless the engaging pins of the shuttle conveyor are disengaged from the corresponding engaging holes of the vehicle body after the vehicle body is transferred onto the belt conveyor. In order to disengage the engaging pins from the engaging holes, it is necessary to move downward the engaging pins or the whole supporting mechanism. However, this requirement provides the problem that the structure becomes inevitably complex.

SUMMARY OF THE INVENTION

While noting the above situation, it is an object of the present invention to provide a vehicle body conveying apparatus in which, even when a belt conveyor is used in lieu of a conventional roller conveyor, the vehicle body can be smoothly transferred and conveyed, and in which the vehicle body can be disengaged from a shuttle conveyor by a simple mechanism.

To attain the above object, the present invention provides an apparatus for conveying a vehicle body, comprising:

a shuttle conveyor having engaging pins engageable with engaging holes bored in a pair of left and right side members extending along left and right side sills of the vehicle body and welded to a lower surface of a floor panel of the vehicle body, said shuttle conveyor conveying the vehicle body from a vehicle body catching position from a preceding step to a transferring position while supporting said side members having said engaging holes engaged by said engaging pins;

an inclining belt conveyor disposed at said transferring position and including a pair of endless belts supporting the left and right side sills of the vehicle body conveyed to said transferring position, a receiving side of said belt conveyor for receiving the vehicle body being capable of inclining around its delivery side for delivering the vehicle body so as to stop said receiving side at least at two positions, that is, an engaging pin disengaging position where the vehicle body conveyed to said transferring position by said shuttle conveyor is moved upward to disengage said engaging pins from said engaging holes, and a vehicle body delivery position where the vehicle body supported at said side sills is conveyed toward the delivery side by said endless belts:

an elevating mechanism located at the vehicle body receiving side of said inclining belt conveyor to incline said inclining belt conveyor:

a slat conveyor located at the delivery side of said inclining belt conveyor to convey the vehicle body in the vehicle body conveying direction while supporting said left and right side members of the vehicle body; and a miniconveyor located between said inclining belt conveyor and said slat conveyor in a relation in which its rear end overlaps the vehicle body delivery side of said inclining belt conveyor and its front end overlaps a receiving side of said slat conveyor, said miniconveyor transferring the vehicle body conveyed from said inclining belt conveyor to said slat conveyor while supporting said side sills of the vehicle body.

When the vehicle body is conveyed to the vehicle body transferring position by the shuttle conveyor, the elevating mechanism is actuated to move the inclining belt conveyor from its lower position to its upper position. That is, the receiving side of the inclining belt conveyor is elevated to incline the conveyor, with the result that the engaging pins are disengaged from the engaging holes of the vehicle body, and the shuttle conveyor disengaged from the vehicle body is retracted. When the vehicle body being conveyed by the inclining belt conveyor reaches the delivery end of the conveyor, the side sills ride on the miniconveyor, and the vehicle body is conveyed by the miniconveyor onto the slat conveyor. This slat conveyor conveys the vehicle body while supporting the left and right side members of the vehicle body.

BEST MODE FOR CARRYING OUT THE INVENTION

An embodiment of the present invention will now be described by reference to the drawings.

Figure 1:
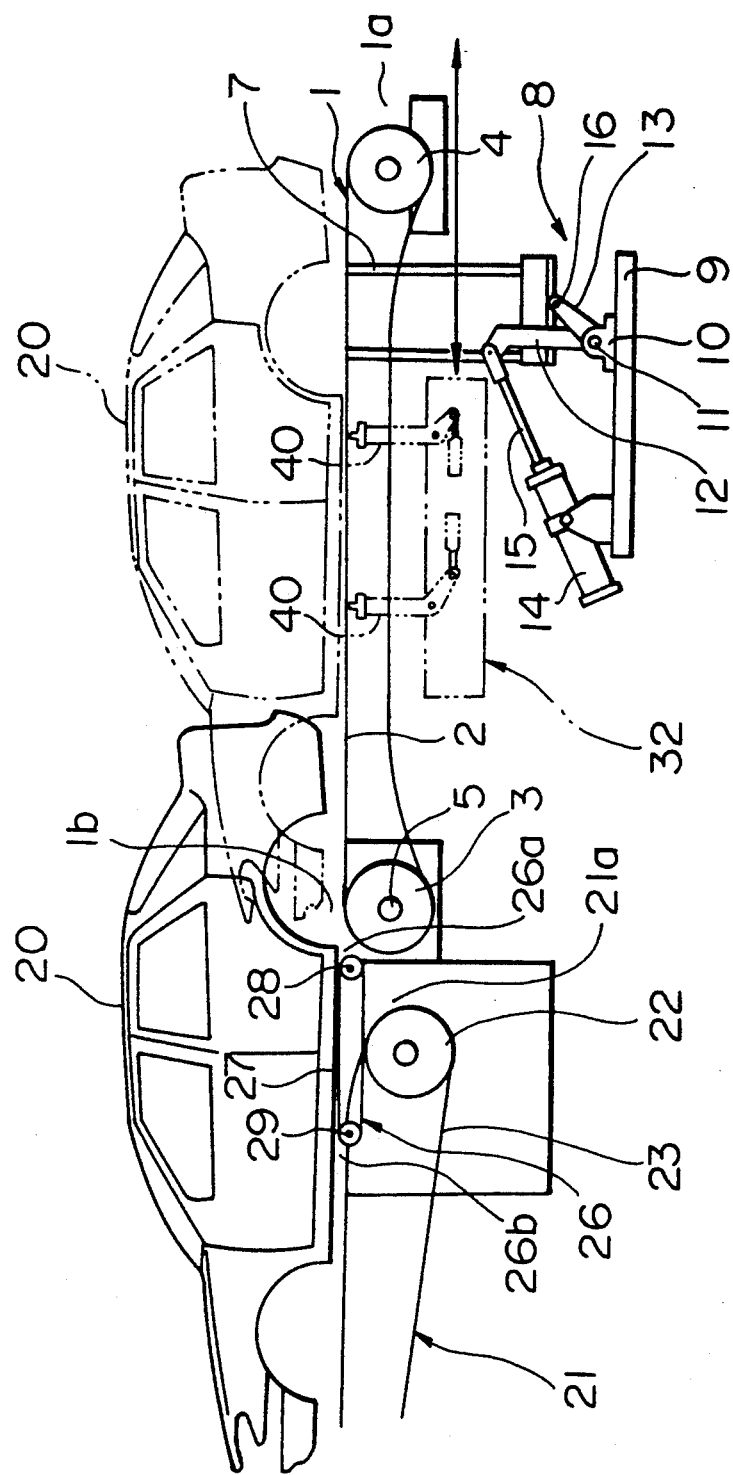
FIG. 1 is a side elevational view of an embodiment of the vehicle body conveying apparatus according to the present invention.
Figure 2:
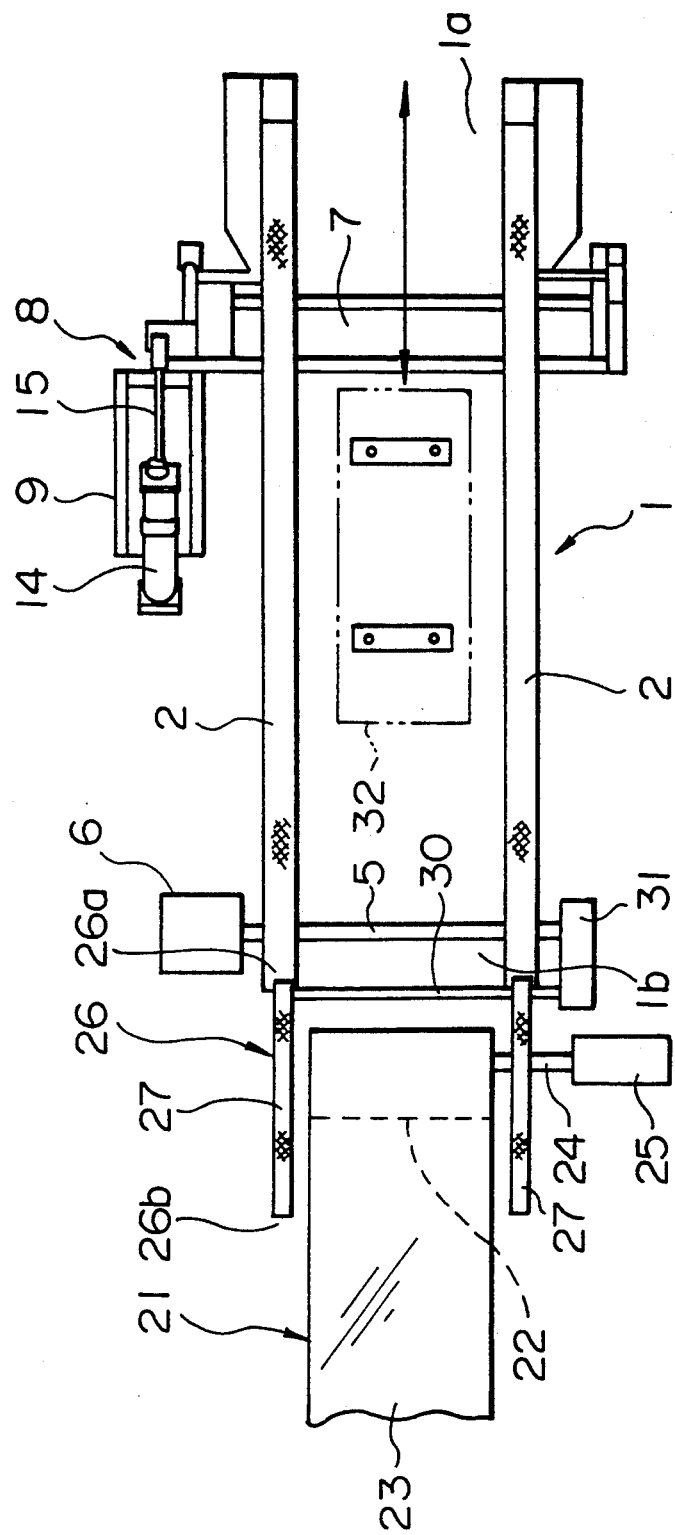
FIG. 2 is a plan view of the conveying apparatus shown in FIG. 1.

Referring to FIGS. 1 and 2, an inclining belt conveyor 1 consists of a pair of spaced parallel running endless belts 2 passed around a driving pulley 3 and a driven or follower pulley 4. This driving pulley 3 is fixedly mounted on a drive shaft 5, and this drive shaft 5 is interlocked at one end with a drive mechanism 6 located outside of the endless belts 2.

Further, the follower pulley 4 is supported by a frame 7, and this frame 7 is supported by an elevating mechanism 8. This elevating mechanism 8 includes a base 9, and a pivot shaft 11 is rotatably journalled in a bearing block 10 on the base 9. A first arm 12 and a second arm 13 are fixed at their lower ends to the pivot shaft 11.

A rod 15 extending from a cylinder 14 supported in inclined relation on the base 9 is linked to the upper end of the first arm 12, and a roller 16 making rolling engagement with the lower surface of the frame 7 is mounted on the upper end of the second arm 13.

Therefore, when the rod 15 is withdrawn into the cylinder 14, the first arm 12 acts to rotate the pivot shaft 11, and, with the rotation of the pivot shaft 11, the second arm 13 swings upward to elevate the frame 7 by the function of the engaging roller 16, with the result that the inclining belt conveyor 1 can be urged upward on the side of the follower pulley 4 around the side associated with the driving pulley 3.

Figure 3:
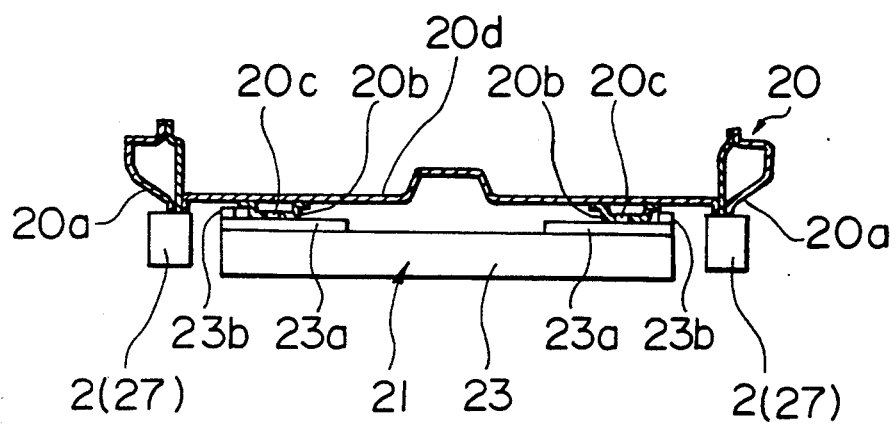
FIG. 3 is a sectional view showing how the vehicle body is supported by the slat conveyor.

The distance between the endless belts 2 of the inclining belt conveyor 1 is equal to that between left and right side sills 20a of a vehicle body 20. As shown in FIG. 3, the endless belts 2 can convey the vehicle body 20 in one direction by supporting the left and right side sills 20a of the vehicle body 20. The receiving and delivery sides of the conveyor 1 are designated by 1a and 1b respectively.

A known slat conveyor 21 is located on the delivery side 1b of the inclining belt conveyor 1. This slat conveyor 21 consists of an endless belt 23 having a large width passed around a driving pulley 22 and a follower pulley (not shown).

The width of the endless belt 23 is narrower than the distance between the endless belts 2 of the inclining belt conveyor 1. As shown in FIG. 3, the endless belt 23 can convey the vehicle body 20 in one direction by supporting left and right side members 20b welded to the lower surface of a floor panel 20d of the vehicle body 20. The receiving end of this slat conveyor 21 is designated by 21a.

In order that the side members 20b of the vehicle body 20 may not be hurt by engagement with the endless belt 23 of the slat conveyor 21 during conveying, seats 23a molded from a resin and having a large width are integrally mounted on the left and right edges of the endless belt 23 as shown in FIG. 3. Further, shift stopper lugs 23b are provided outside of the seats 23a so as to prevent escapement of the side members 20b of the vehicle body 20 due to leftward or rightward shifting of the vehicle body 20 during conveying.

The driving pulley 22 is fixedly mounted on a drive shaft 24 and this drive shaft 24 is interlocked at one end with a drive mechanism 25 disposed outside of the endless belt 23.

Further, a miniconveyor 26 is disposed between the delivery side 1b of the inclining belt conveyor 1 and the receiving side 21a of the slat conveyor 21. This miniconveyor 26 consists of a pair of spaced parallel running endless belts 27 passed around a driving pulley 28 and a follower pulley 29.

The driving pulley 28 is fixedly mounted on a drive shaft 30, and this drive shaft 30 is interlocked at one end with the drive shaft 5 through a speed-reduction interlocking mechanism 31 disposed outside of the endless belts 27. These endless belts 27 are arranged to be driven in synchronism with the endless belts 2 by the drive mechanism 6 which is the drive source for the endless belts 2 of the inclining belt conveyor 1.

The receiving side 26a of the miniconveyor 26 overlaps the delivery side 1b of the inclining belt conveyor 1, and the delivery side 26b of the miniconveyor 26 overlaps the receiving side 21a of the slat conveyor 21. As shown in FIG. 3, the relative levels of the surface of the miniconveyor 26 and that of the slat conveyor 21 supporting the vehicle body 20 are determined so that the vehicle body 20 can be transferred while being substantially horizontally maintained. Also, the surface of the inclining belt conveyor 1 and that of the miniconveyor 26 supporting the side sills 20a are on the same level.

Further, as in the case of the inclining belt conveyor 1, the distance between the endless belts 27 of the miniconveyor 26 is equal to that between the left and right side sills 20a of the vehicle body 20, so that, as shown in FIG. 3, the miniconveyor 26 can convey the vehicle body 20 in one direction by supporting the left and right side sills 20a of the vehicle body 20.

Thus, the inclining belt conveyor 1 and the slat conveyor 21 are associated with each other by means of the miniconveyor 26, so that the vehicle body 20 can be smoothly transferred from the inclining belt conveyor 1 to the slat conveyor 21.

Figure 4:
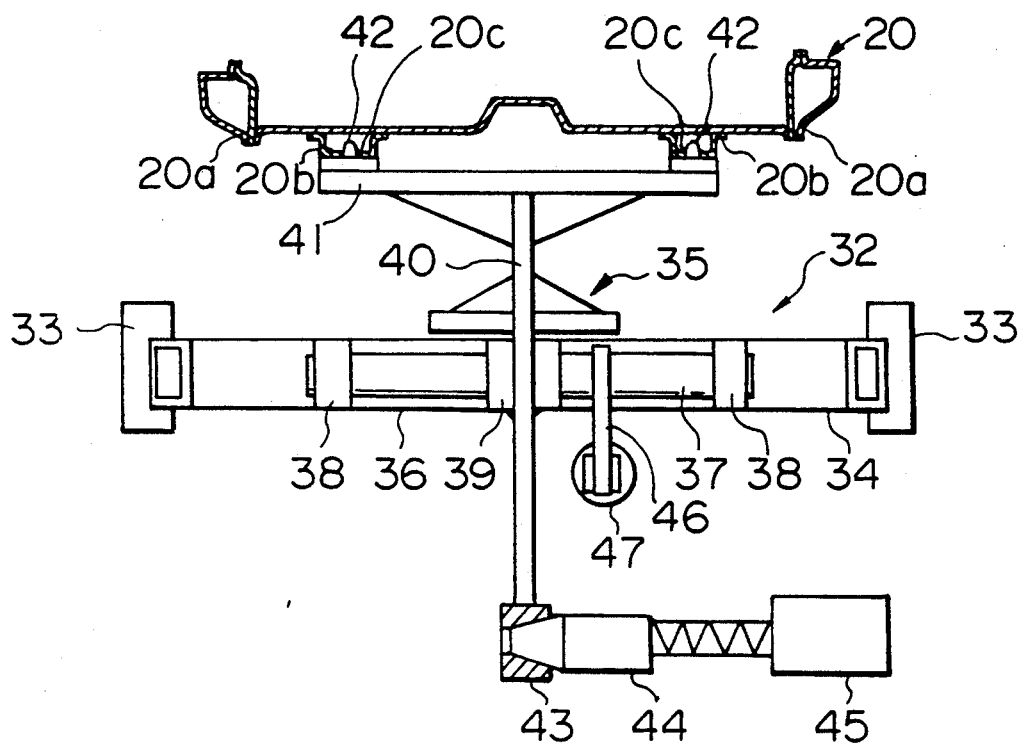
FIG. 4 is a sectional view showing how the vehicle body is supported by the shuttle conveyor.
Figure 5:
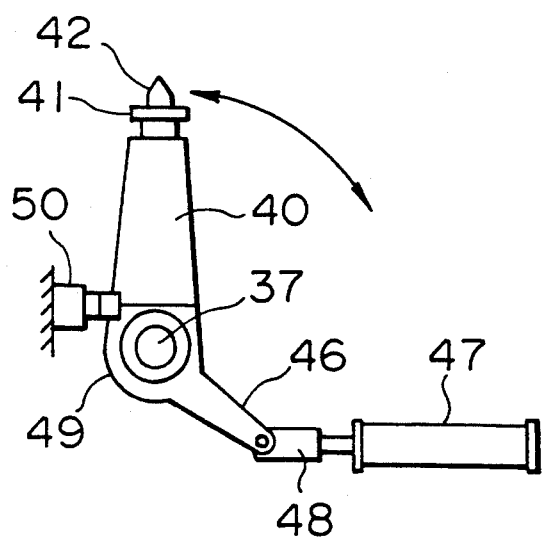
FIG. 5 is a side elevational view showing the mechanism supporting the shuttle conveyor.

On the other hand, a shuttle conveyor 32 having its conveying path extending between the endless belts 2 of the inclining belt conveyor 1 is provided. This shuttle conveyor 32 has a structure as shown in FIGS. 4 and 5. The shuttle conveyor 32 includes a shuttle bar 34 capable of making free reciprocating motion in the directions of the arrows shown in FIG. 2 by being guided by shuttle guides 33, and this shuttle bar 34 is provided with a supporting mechanism 35.

This supporting mechanism 35 will now be explained. Each of a pair of shafts 37 spaced apart in the moving direction of the shuttle conveyor 32 is rotatably journalled at its both ends in bearings 38 on a frame 36.

A rocking arm 40 is fixed at its middle part to the axially middle position of each shaft 37 by means of a grasping member 39, and a supporting plate 41 is horizontally fixed to the upper end of the rocking arm 40. Engaging pins 42 engageable with engaging holes 20c bored in the side members 20b of the vehicle body 20 protrude upward from the both ends of the supporting plate 41.

A pin fitting member 43 having a tapered hole is fixed to the lower end of the rocking arm 40, and a positioning pin 44 that can be inserted into and withdrawn from the tapered hole of the pin fitting member 43 is disposed opposite to this member 43. This positioning pin 44 is supported by an advance/retract drive mechanism 45 so that it can be advanced toward and retracted from the tapered hole. Therefore, when the positioning pin 44 is inserted into the tapered hole of the pin fitting member 43, the rocking arm 40 is locked against its rocking motion and maintained in its vertical state.

Further, on one side of each grasping member 39, a lever 46 is fixedly mounted at its upper end on the shaft 37 and connected at its lower end to a rod 48 of a cylinder 47. The cylinder 47 acts &o cause rocking motion of the lever 46 thereby rotating the shaft 37 so that the rocking arm 40 makes its rocking movement in the directions of the arrows shown in FIG. 5. The reference numeral 49 designates a bracket, and 50 designates a stopper engageable with the bracket 49.

The operation of the vehicle body conveying apparatus having the above structure will now be described. The two front and rear rocking arms 40 in the supporting mechanism 35 supporting the shuttle conveyor 32 are maintained in their vertical state, and the engaging pins 42 provided on these rocking arms 40 are in engagement with the engaging holes 20c bored in the side members 20b of the vehicle body 20.

Therefore, the vehicle body 20 is supported by the four engaging pins 42 of the supporting mechanism 35. When the supporting mechanism 35 is advanced along the shuttle guides 33 until the vehicle body 20 is conveyed to the position opposite to the inclining belt conveyor 1, the supporting mechanism 35 is urged downward to place the vehicle body 20 on the inclining belt conveyor 1, and the left and right side sills 20a of the vehicle body 20 are supported on &he endless belts 2 of the inclining belt conveyor 1. Thus, when the vehicle body 20 is conveyed to the transferring position by the function of the shuttle conveyor 32, the inclining belt conveyor 1 is stopped at the vehicle body receiving position where the side of the follower pulley 4 is located beneath the horizontal position that is the normal vehicle body delivery position.

As soon as the conveyance of the vehicle body 20 to the transferring position of the inclining belt conveyor 1 is confirmed, the cylinder 14 in the elevating mechanism 8 is actuated to retract the rod 15. As a result, the pivot shaft 11 is rotated by the function of the first arm 12, and, with the rotation of the pivot shaft 11, the second arm 13 swings upward, so that the frame 7 is urged upward by the engaging roller 16.

Therefore, the inclining belt conveyor 1 is urged upward at the side of the follower pulley 4 around the side of the driving pulley 3. As a result, the inclining belt conveyor 1 stops at the engaging pin disengaging position where the side of the follower pulley 4 is located upward relative to the horizontal position that is the normal vehicle body delivery position, and both the inclining belt conveyor 1 and the vehicle body 20 are inclined. Therefore, the engaging pins 42 of the supporting mechanism 35 are disengaged from the engaging holes 20c of the side members 20b, and the vehicle body 20 is separated from the shuttle conveyor 32.

Then, after each advance/retract mechanism 45 in the supporting mechanism 35 operates to cause retraction of the positioning pin 44 from the pin fitting member 43, the rod 48 is protruded by the operation of the cylinder 47, and the lever 46 makes rocking motion in the clockwise direction. Therefore, each shaft 37 rotates, and, due to the rotation of the shaft 37, the rocking arm 40 makes clockwise rocking motion.

After the rocking arms 40 make the clockwise rocking motion to take the horizontal retired position, the shuttle conveyor 32 is retracted to the position where it conveys the next vehicle body 20. Then, the cylinder 14 in the elevating mechanism 8 is actuated again to cause protrusion of the rod 15. As a result, the pivot shaft 11 is rotated by the first arm 12, and, with the rotation of the pivot shaft 11, the second arm 13 makes downward swinging motion so that both the engaging roller 16 and the frame 7 are urged downward.

Therefore, the inclining belt conveyor 1 is urged downward at the side of the follower pulley 4 around the side of the driving pulley 3 until it stops at the vehicle body delivery position where both the inclining belt conveyor 1 and the vehicle body 20 are in their horizontal state. Then, the drive mechanism 6 for the inclining belt conveyor 1 is actuated to run the endless belts 2 so as to. convey the vehicle body 20 toward the delivery side 1b. The rotation of the drive mechanism 6 is suitably controlled by a control device (not shown), so that, at the time of delivery of the vehicle body 20 to the slat conveyor 21, the interval between the vehicle body 20 transferred already on the slat conveyor 21 and that being now transferred to the slat conveyor 21 can be set at the predetermined desired value.

Because the miniconveyor 26 is disposed in overlapping relation with &he delivery side 1b of the inclining belt conveyor 1, the vehicle body 20 can be smoothly transferred to the receiving side 26a of the miniconveyor 26 and is then conveyed to the receiving side 21a of the slat conveyor 21.

Because, in this case, the distance between the endless belts 27 of the miniconveyor 26 is selected to be equal to that between the endless belts 2 of the inclining belt conveyor 1, the side sills 20a of the vehicle body 20 are supported by the miniconveyor 26, and the slat conveyor 21 conveys the vehicle body 20 while supporting the side members 20b of the vehicle body 20. Therefore, at the delivery side 26b of the miniconveyor 26, the side sills 20a of the vehicle body 20 are supported by the miniconveyor 26, and the side members 20b are supported by the slat conveyor 21.

Thus, the vehicle body 20 conveyed by the shuttle conveyor 32 is conveyed by the inclining belt conveyor 1 to be transferred to the slat conveyor 21. By the provision of the miniconveyor 26 between the inclining belt conveyor 1 and the slat conveyor 21, the vehicle body 20 can be smoothly transferred.

In the embodiment described above, the inclining belt conveyor 1 is stopped when this conveyor 1 is elevated (inclined) by the elevating mechanism 8. However, the inclining belt conveyor 1 may be inclined during running.

Further, although one end of the drive shaft 30 having the driving pulley 28 is interlocked with the drive shaft 5 through the speed-reduction interlocking mechanism 31 so as to provide the drive source for the Pulley 28 driving the miniconveyor 26, an independent drive mechanism may be provided.

It will be understood from the foregoing description that, according to the present invention. A vehicle body conveyed by a shuttle conveyor is placed at its left and right side sills on an inclining belt conveyor to be conveyed by this inclining belt conveyor, and, after the vehicle body conveyed to the delivery end of the inclining belt conveyor is transferred to a miniconveyor, the vehicle body supported at the side sills by the miniconveyor is delivered to a slat conveyor. Therefore, even when an inclining belt conveyor is used in place of a conventional roller conveyor, a vehicle body can be smoothly transferred to the inclining belt conveyor so that the vehicle body can be smoothly conveyed.

The present invention is also effective in that, by inclining the inclining belt conveyor, the vehicle body can be easily separated from the shuttle conveyor, and the structure of the conveying apparatus is also simple.

What is claimed is:

1. An apparatus for conveying a vehicle body, comprising:

a shuttle conveyor having engaging pins engageable with engaging holes bored in a pair of left and right side members extending along left and right side sills of the vehicle body and welded to a lower surface of a floor panel of the vehicle body. said shuttle conveyor conveying the vehicle body from a vehicle body catching position from a preceding step to a transferring position while supporting said side members having said engaging holes engaged by said engaging pins;

an inclining belt conveyor disposed at said transferring position and including a pair of endless belts supporting the left and right side sills of the vehicle body conveyed to said transferring position, a receiving side of said belt conveyor for receiving the vehicle body being capable of inclining around its delivery side for delivering the vehicle body so as to stop said receiving side at least at two positions, that is, an engaging pin disengaging position where the vehicle body conveyed to said transferring position by said shuttle conveyor is moved upward to disengage said engaging pins from said engaging holes, and a vehicle body delivery position where the vehicle body supported at said side sills is conveyed toward the delivery side by said endless belts:

an elevating mechanism located at the vehicle body receiving side of said inclining belt conveyor to incline said inclining belt conveyor:

a slat conveyor located at the delivery side of said inclining belt conveyor to convey the vehicle body in the vehicle body conveying direction while supporting said left and right side members of the vehicle body; and a miniconveyor located between said inclining belt conveyor and said slat conveyor in a relation in which its rear end overlaps the vehicle body delivery side of said inclining belt conveyor and its front end overlaps a receiving side of said slat conveyor, said miniconveyor transferring the vehicle body conveyed from said inclining belt conveyor to said slat conveyor while supporting said side sills of the vehicle body.

2. A vehicle body conveying apparatus according to claim 1, wherein, when the vehicle body is conveyed to the transferring position by said shuttle conveyor, said inclining belt conveyor is stopped at a vehicle body receiving position where its receiving side is located at a level lower than the vehicle body delivery position.

3. A vehicle body conveying apparatus according to claim 1, wherein said endless belts of said inclining belt conveyor and said miniconveyor are synchronously driven by a single drive source.

4. A vehicle body conveying apparatus according to claim 1, wherein said elevating mechanism of said inclining belt conveyor includes a first arm fixed at one end to a pivot shaft and connected at the other end to a cylinder, and a second arm fixed at one end to said pivot shaft and arranged at the other end to cause the inclination of the vehicle body receiving side of said inclining belt conveyor by making interlocking operation with the rotation of said first arm by the operation of said cylinder.

5. A vehicle body conveying apparatus according to claim 1, wherein the operation of said endless belts of said inclining belt conveyor is controlled so that, at the time of delivery of the vehicle body onto said slat conveyor, a predetermined desired interval can be set between the vehicle body being delivered now and that delivered already and being conveyed by said slat conveyor.

6. A vehicle body conveying apparatus according to claim 1, wherein said engaging pins are provided on an upper end of a rocking arm fixed at its lower end to a pivot shaft, a lever fixed at an end to said pivot shaft being connected at its free end to a cylinder, said cylinder acting to cause rocking motion of said rocking arm from a vertical position where said engaging pins are engaged by said engaging holes to a retracted position where said engaging pins are disengaged from said engaging holes, and locking means cooperating with the lower end of said rocking arm is provided so that said rocking arm can be releasably held in said vertical position where said engaging pins are engaged by said engaging holes.

7. A vehicle body conveying apparatus according to claim 1, wherein a supporting surface of said inclining belt conveyor and that of said miniconveyor supporting said side sills of the vehicle body have substantially the same level, so that the vehicle body can be transferred while being substantially horizontally maintained.

8. A vehicle body conveying apparatus according to claim 1, wherein a supporting surface of said miniconveyor and that of said slat conveyor supporting the vehicle body have their relative levels set so that the vehicle body can be transferred while being substantially horizontally maintained.

* * * * *

UNITED STATES PATENT AND TRADEMARK OFFICE
CERTIFICATE OF CORRECTION

PATENT NO. : 5,322,156
DATED : June 21, 1994
INVENTOR(S) : Kakita et al.

It is certified that error appears in the above-indentified patent and that said Letters Patent is hereby corrected as shown below:

On the title page: item number [86]

please change "PCT No.: PCT/JP90/01112" to

--PCT No.: PCT/JP92/01112--.

Signed and Sealed this

Sixth Day of June, 1995

Attest:

BRUCE LEHMAN

Attesting Officer  Commissioner of Patents and Trademarks